July 27, 1965
V. WEBER
3,197,595
CONTROL DEVICE
Filed Aug. 23, 1960
2 Sheets-Sheet 1
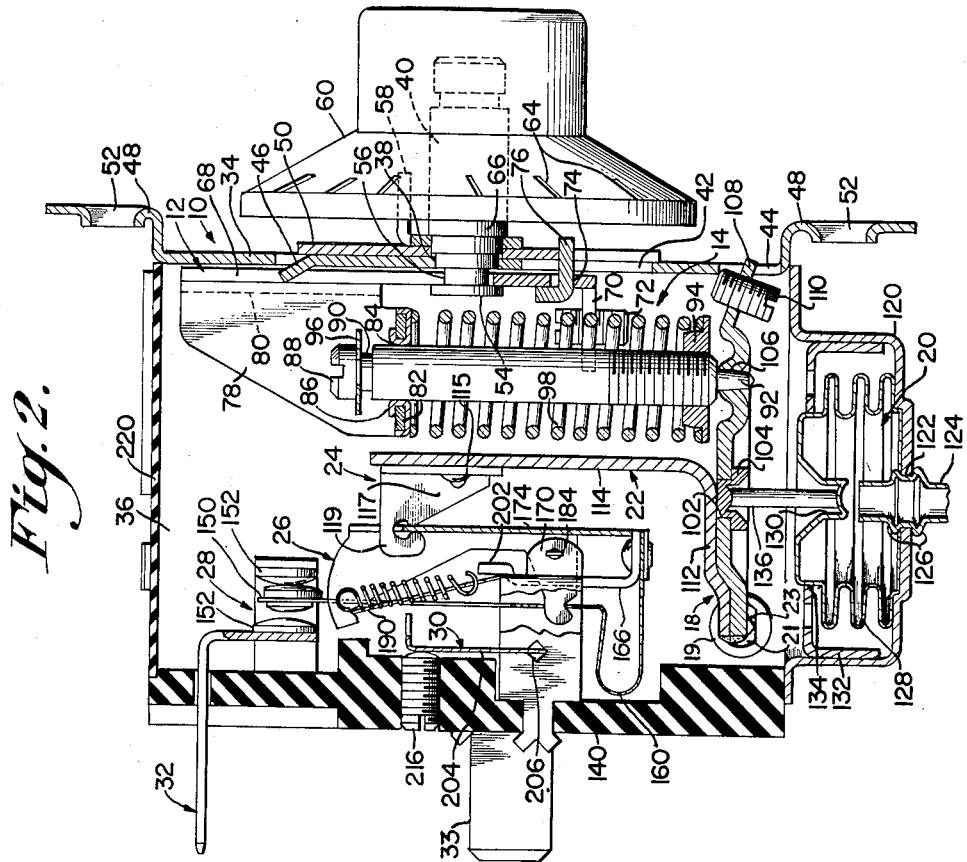
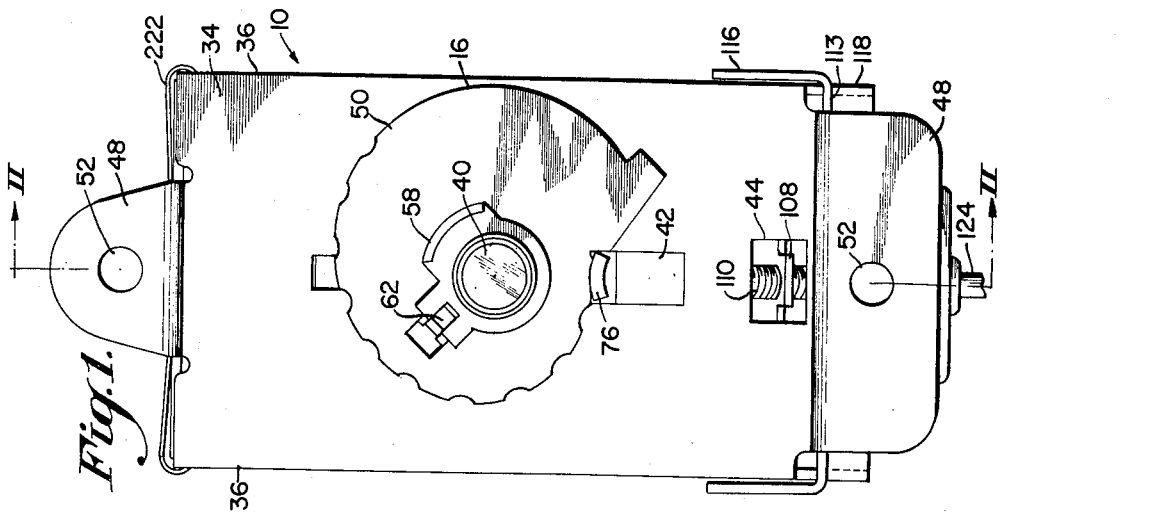

July 27, 1965  V. WEBER  3,197,595
CONTROL DEVICE
Filed Aug. 23, 1960  2 Sheets-Sheet 2

United States Patent Office 3,197,595
Patented July 27, 1965

3,197,595
CONTROL DEVICE
Victor Weber, Greensburg, Pa., assignor to Robertshaw Controls Company, a corporation of Delaware
Filed Aug. 23, 1960, Ser. No. 51,439
7 Claims. (Cl. 200—140)

The present invention relates to controllers and more particularly to a control mechanism of the multilever type employing a snap acting mechanism.

In prior devices, wherein a control device has been actuated in response to movement of a thermostatic device measuring ambient conditions, the movement of a snap actuated switch arm from a closed to an open position has been characterized by a large displacement. Often, considerable force or a large displacement has been necessary to actuate the switch while in the actuated position. This presents a great disadvantage in many controls as it is highly desirable to close the switch mechanism with a relatively small force and little displacement so as to obtain rapid switch actuation while housing the switch mechanism in a relatively small casing.

In addition, as the switch is actuated to thereby open the electrical circuit, the action of the switch arm has been dependent upon the displacement of the thermostatic element. If the thermostatic element has displaced the arm a considerable distance, it must move this distance and often a greater distance to close the switch, thereby delaying the response which reduces the effectiveness of the controller or switch mechanism. If the differential travel of the switch arm to the closed position can be reduced, the switch mechanism will have an increased rate of response, thereby providing a more efficient and responsive controller. This is especially true in refrigerator and heater control units which are normally actuated by a thermally responsive element.

The construction of prior control devices actuated by thermally responsive elements has also presented other problems in that the control device has generally been designed to perform within a particular range of temperatures with no provision for modifying the designed structure to compensate for variables, such as vapor charge, temperature level, and temperature range.

It is, therefore, an object of this invention to eliminate the foregoing problems by a relatively simple, compact switch mechanism.

Another object of this invention is to arrange the components of this device so that they can be manufactured and tested as complete subassembly units to assure uniform and accurate adjustment before assembly.

Still another object of this invention is to render the control device simple and compact and adapted for rapid assembly and relatively inexpensive manufacture.

A further object of this invention is to adjust the movement of the snap action switch mechanism to obtain a minimum differential.

Another object of this invention is to positively displace the mated movable and stationary contacts of the switch mechanism for wiping action.

A further object of this invention is to preclude the components of the magnitude of the contact pressure force from affecting the components of the wiping action force between mated contacts in a snap acting switch.

Still another object of this invention is to adapt the control device to various ranges of operating characteristics by replacing a single variable element.

In one aspect of this invention, a cam positions a cam follower to vary the biasing force upon a lever which is oppositely acted upon by a thermally responsive device. A second lever actuates an overcenter snap acting mechanism from its initial biased position to a second position to thereby control an electrical circuit. The differential travel of the snap acting mechanism in its second position is controlled by an adjustment means. Other adjustment means control excessive forces generated by the thermally responsive device to prevent damage to the snap acting mechanism and lever system.

Other objects and advantages of this invention will become apparent from the following description taken in connection with the accompanying drawings wherein:

FIG. 1 is a front elevational view of the control device embodying this invention;

FIG. 2 is a cross sectional view of the control device shown in FIG. 1 taken substantially along the line II—II;

Figure 5:
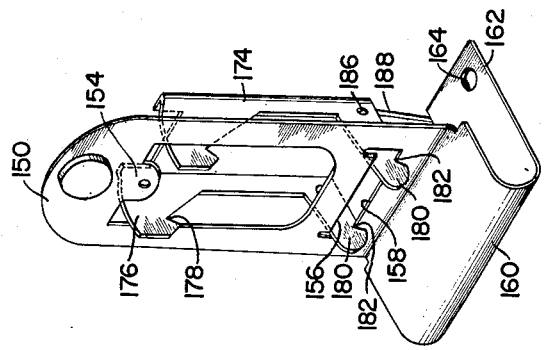
FIG. 5 is a perspective view of the contact carrying blade and lever of FIGS. 3 and 4.

Referring more particularly to the drawings, there is illustrated a housing 10 which mounts a slotted sliding plate 12. Sliding plate 12 is adapted to carry an adjustment spring and screw assembly 14. An adjusting control stem and cam assembly 16 extends through an aperture in one wall of the housing 10 to actuate the sliding plate 12 in a manner hereinafter described.

Spring and screw assembly 14 operatively engage the free end of a pivoted lever 18. A bellows and motion transmitting assembly 20, disposed on the opposite side of lever 18 from that of spring and screw assembly 14, operatively engages an intermediate portion of lever 18. An L-shaped lever 22 is secured to the pivoted end of lever 18 and translates the vertical reciprocal motion of the bellows and motion transmitting assembly 20 to horizontal reciprocal motion. An insulating member 24 transmits the motion of lever 22 to a switch mechanism 26 to actuate movable contact 28. Terminals 32, 33 electrically connect the control device to a source of electrical power and a load circuit (not shown).

As is best shown in FIGS. 1 and 2, the housing 10 is formed in a U-shaped configuration to have a front wall 34 and two side walls 36. Centrally located in the front wall 34 is an aperture 38 which is of a size suitable to accept an adjusting stem 40 extending therethrough. A substantially rectangular slot 42 is formed in the front wall 34 directly beneath the aperture 38. A second substantially rectangular slot 44 is formed in the lowermost portion of the front wall 34. A tang 46, having a width substantially equal to the width of the necked-down portion 56 of the adjusting stem 40, is formed in the upper portion of the front wall 34 of the housing 10.

Located at the remote ends and integrally formed with the front wall 34 of the housing 10 are mounting brackets 48 having the configuration shown in FIGS. 1 and 2. In each mounting bracket, there is centrally located a tapped aperture 52 which is adapted to accommodate suitable mounting devices, such as screws. In addition, it is to be understood that a suitable index plate can be mounted on the mounting brackets to indicate relative control of the control device.

An integrally formed collar 54, having a diameter substantially the same as the aperture 38, is located at the inner end of the adjusting stem 40. The diameter of the collar 54 is greater than the diameter of the necked-down portion 56 of the adjusting stem 40. A cam 50 and a drive lug 58 are press-fitted on the exposed outwardly extending portion of the adjusting stem 40. The cam 50 and drive lug 58 are anchored together by means of a tab 62 on the cam 50 cooperating with a bifurcated member on the drive lug 58 so as to insure simultaneous movement of the two upon rotation of adjusting stem 40.

The outer portion of the adjusting stem 40 is formed to accept a molded dial knob 60. The dial knob 60 is shaped to cooperate with drive lug 58 and adjusting stem 40 to simultaneously rotate drive lug 58 and cam 50 as previously explained. Suitable indicia 64 is located on the dial knob 60, which indicia indicates the position of the dial knob 60 setting relative to an index plate (not shown) to obtain switch control.

The sliding plate 12, having a width substantially equal to the width of the front wall 34 of the housing 10, is positioned on the opposite side of the front wall to that of the cam 50 and drive lug 58. The thickness of the sliding plate 12 is slightly less than the thickness of the necked-down portion 56 of the adjusting stem 40. An elongated slot 68 extends substantially more than half the length of the sliding plate 12 and has a width which is slightly greater than the width of the tank 46 and the necked-down portion 56 of the adjusting stem 40. At the lowermost portion and on one side of the sliding plate 12, an arcuately formed portion 70 is bent inwardly, which portion has an aperture therein which is tapped to accept an adjustment screw 72. The arcuately formed portion 70 is located adjacent to one sidewall 36 of the housing 10 so that it is not located directly beneath the slot 68 in the slide plate 12.

Also formed in the lowermost portion of the slide plate 12 is a substantially rectangular aperture 74. The slide plate 12 can be inserted from the bottom of housing 10 in such a manner that collar 54 of adjusting stem 40 will engage the adjacent side surfaces of the slot 68 in slide plate 12 whereby slide plate 12 will have motion substantially in the vertical direction only.

An L-shaped lug 76 is inserted in the substantially rectangular aperture 74 in sliding plate 12 and extends outwardly of housing 10 a sufficient distance to engage the peripheral surface of cam 50 of adjusting stem and cam assembly 16. Cam 50 has a scalloped peripheral edge which cooperates with lug 76 to obtain definite setting of dial knob 60 upon rotation thereof.

It will easily be seen that upon rotation of the adjusting stem 40, the periphery of cam 50 will engage one leg of the lug 76 so that the lug 76 will act as a cam follower. Motion of the cam 50 is transmitted to lug 76, which motion will actuate lug 76 in a downward direction. As lug 76 is attached to sliding plate 12, the motion is transmitted to sliding plate 12 to force it in a downward direction. Spring 98 effects motion of sliding plate 12 in an upward direction. As the necked-down portion 56 of adjusting stem 40 and tang 46 form guides to cooperate with slot 68 of sliding plate 12, the sliding plate will move in an upward or downward direction in accordance with the motion transmitted by cam 50 and spring 98. Collar 54 of adjusting stem 40 engages the flat surfaces adjacent slot 68 of sliding plate 12 so as to prevent disengagement from adjusting stem 40.

A substantially U-shaped bracket 78, having outwardly extending flanges 80 integrally formed substantially the length of each leg of bracket 78, is secured to sliding plate 12. The flanges 80 provide an elongated flat surface for spot welding or otherwise securing bracket 78 to sliding plate 12 adjacent to the slot located therein.

Centrally located in the bight portion 82 of the bracket 78 is an aperture 84 to receive a metal eyelet 86 which is spun over the adjacent peripheral area of the aperture to secure the eyelet 86 in place.

An adjusting screw 88, having an annular recess 90 adjacent the head portion thereof, is guided in the eyelet 86. The threaded end of screw 88 has a conical projection 92 extending therefrom. A spring retainer disc 94 is threaded on the threaded end of screw 88. A snap lock washer 96 is secured in recess 90. A helical spring 98 extends between the underside of eyelet 86 and disc 94. Spring 98 biases screw 88 in a downward direction so that if slide plate 12 is removed, lock washer 96 will engage the adjacent side of eyelet 86.

It will easily be seen that the construction so far described can be assembled as a separate subassembly with springs having various tension forces being incorported in the subassembly. In addition, it will readily be seen that various lengths can be given to the adjusting stem 40 so as to accommodate various shaped dial knobs, as desired.

The lever 18 is of elongated arcuate form and is positioned in the lower portion of the housing 10 in such a manner that the side walls 36 of the housing 10 form the fulcrums for the lever. In each wall of the housing, inwardly recessed bosses 19 are formed. Each boss 19 has an opening 21 to receive projecting knife edges 23 formed on one end of lever 18 and riding on the lower edge of opening 21. In this manner, the lever 18 is pivoted about one end between the walls 36 of housing 10.

Centrally disposed in the lever 18 is an aperture 102 for the reception of a recessed plug 104. A second aperture 106 in lever 18 receives the projection 92 on screw 88. The free end 108 of lever 18 is sloped downwardly and an adjusting screw 110 is threaded therein. An L-shaped lever 22 is rigidly secured to the pivoted end of lever 18 by any suitable means, such as spot welding, so that the base leg portion of lever 22 extends along the upper surface of lever 18. The upwardly extending leg 114 of lever 22 thereby extends in a plane substantially parallel to the longitudinal axis of the screw 88.

Insulating member 24 is attached to the free end of lever 22 as by means of rivets 115 and has a leg member 117 provided with a hook-shaped portion 119 which engages switch lever arm 174 to transmit motion applied to lever 18 to switch mechanism 26.

It will readily be seen that the two levers 18 and 22 can be assembled together and then mounted to the housing 10 in a manner such as to cooperate with spring and screw assembly 14. The free end 108 of lever 18 projects through the aperture 44 in the housing 10 in such a manner that adjusting screw 110 will engage the upper edge of the aperture 44 to thereby limit the counterclockwise motion of levers 18 and 22.

The bellows assembly 20 forms the bottom wall of the control device. A substantially U-shaped mounting plate 113, having upwardly extending legs 116, as shown in FIG. 1, is slotted to receive integrally formed lugs 118 on side walls 36 of housing 10 which are twisted after assembly to fasten the bellows assembly 20 in operative relation to the housing 10. A cup-shaped receptacle 120 is centrally located in the mounting plate 113 and has aperture 122 in the bottom wall. A tube 124, having peripheral crimped portions 126, is inserted in aperture 122 and secured thereto by any suitable means, such as soldering. It is to be understood that the tube 124 can be connected to a thermostatic bulb (not shown) containing a temperature responsive charge or other thermostatic device which is exposed to the ambient conditions to be measured. A bellows 128, having a movable end provided with a centrally disposed cavity 130, is seated within the cup-shaped receptacle 120 and is apertured for communication with the tube 124.

A cup-shaped stop member 132, having a centrally disposed aperture 134 therein suitable for accepting the movable end of bellows assembly 20, is press-fitted into the cup-shaped receptacle 120 so as to act as an upper limit stop to the bellows 128. An operating pin 136 is inserted between the bottom wall of cavity 130 and the bottom wall of the recessed plug 104 located on lever 18. Operating pin 136 will transmit the longitudinal motion generated within bellows 128 by expansion or contraction of the fluid charge located therein in response to the ambient condition of the bulb (not shown).

It is readily seen that the bellows assembly 20 can be assembled as a separate subassembly which can be manufactured and tested for the particular ambient conditions to be measured wherein various fluid charges can be used. The bellows assembly 20 can then be assembled to the housing 10.

A base member 140, formed of any suitable insulating material, is positioned between the legs of the housing 10 to form the rear wall thereof. Base member 140 is retained in position between side walls 36 of housing 10 in any suitable manner, such as by a clip or cooperating projections (not shown) on the base member and recesses in the side wall members of the housing 10. A switch mechanism 26, which can be manufactured and assembled to the base member 140 as a subassembly, is positioned on the base member so as to be located between the side walls 36 of the housing 10.

A pair of fixed contacts 152 are mounted in spaced parallel relation on the terminal 32 which extends through and is staked to base member 140 in a manner such as to be electrically connected to conventional lead wires.

Figure 4:
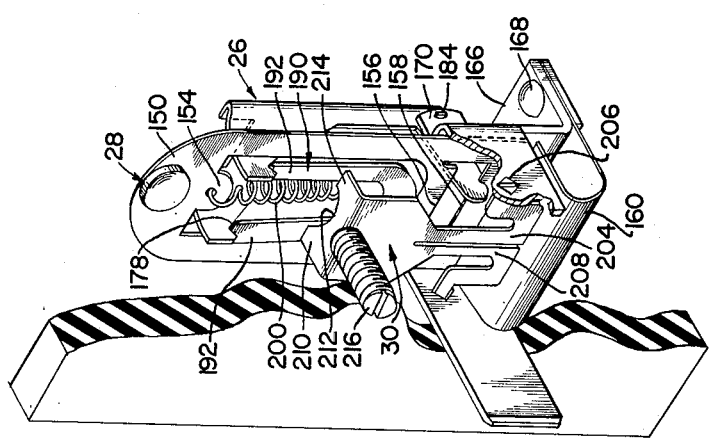
FIG. 4 is a perspective view of the snap acting mechanism shown in FIG. 3.

As is best illustrated in FIGS. 2, 4, and 5, a current carrying switch blade 150 has a generally rectangular configuration and is made from a good conducting material, such as copper or the like, so as to be substantially inflexible. The substantially rigid blade 150 has a movable end portion carrying a contact 28 which is disposed in the space between the fixed contacts 152 that serve as stop members to define the limits of movement of switch blade 150 in a horizontal direction. The central portion of the blade 150 is cut out to define an opening which has an apertured tab 154 extending downwardly from the movable end portion of the blade. A second substantially elongated rectangular opening is formed in the blade 150, which opening has substantially parallel top and bottom edges 156 and 158, respectively. The blade 150 is provided with a U-shaped resilient portion 160 spaced a short distance from the bottom edge 158 of the opening, the free end 162 of which is elongated so as to locate spaced mounting apertures 164.

A U-shaped terminal 33, secured to the lower portion of base 140, extends inwardly of the central cavity of housing 10. Integrally formed with the bight portion of the terminal 33 is a downwardly depending and outwardly extending L-shaped member 166 having a substantially rectangular opening. The portion of this rectangular opening is formed by outwardly punching a pair of tabs 170 at each end of the opening. Each tab 170 extends outwardly for a distance from the plane of the bight portion of terminal 33 and has an aperture 172 formed therein. Two spaced apertures in the member 166 register with mounting apertures 164 located in the free end 162 of blade 150 so that rivets 168 can be positioned therein to secure the L-shaped member 166 and the free end of blade 150 together.

As shown in FIGS. 4 and 5, a switch lever arm 174 has a pair of projecting arms 176 at one end and another pair of projecting arms 180 at the opposite end. The bottom edges of arms 176 have V-shaped knife edges 178 located thereon. The bottom edges of arms 180 have V-shaped knife edges 182 located thereon. Knife edges 182 cooperate with the bottom edge 158 of the rectangular opening located in the lower portion of blade 150.

The switch lever arm 174 is pivotally mounted on the tabs 170 by means of a pin 184 extending through cooperating apertures 172 in tabs 170 and aperture 186 in the lower portion of the lever arm 174. By this construction, as lever arm 174 is pivoted about pin 184, the blade 150 will be moved in a vertical direction in response to the rotational movement of the lower leg member 180.

As the blade 150 has a U-shaped projection 160 in its lowermost portion, which configuration is slightly compressed as shown in FIG. 2, the switch lever arm 174 normally has a force biasing the lower leg member 180 in a clockwise direction. The clockwise movement of switch lever arm 174 is restricted by the engagement of the lowermost end 188 with a cutout in the base leg member of the L-shaped member 166.

A U-shaped snap lever 190 has each of its leg members 192 positioned respectively so as to engage the knife edges 178 and are biased into engagement therewith by a tension spring 200 which extends from an aperture in the bight portion of the lever 190 to the tab 154 of the switch blade 150. By this construction, the switch blade 150 will be biased into engagement with one of the two stationary contacts 152 depending upon the pivotal movement of the snap lever 190.

If the snap lever 190 is positioned as shown in FIG. 2 relative to the switch lever arm 174, tension spring 200 exerts a biasing force on the switch blade 150 tending to rotate the blade in a clockwise direction. It is to be noted that when the switch lever arm 174 is pivoted in a counterclockwise direction to assume the position shown in FIG. 2, the knife edge 178 in its upper leg member 176 is positioned to the left of the blade 150. Upon initial counterclockwise rotation of lever arm 174, the tension spring 200 is at first elongated until the snap arm 190 reaches a vertical dead center position. Upon further rotation, the spring 200 exerts a force whereby the snap arm 190 is pivoted in a counterclockwise direction. From the vertical dead center position, the tension spring 200 tends to reduce its length until the snap arm 190 assumes the position shown in FIG. 2, thereby exerting a clockwise force upon switch blade 150 tending to move the movable contact 28 into engagement with stationary contact 152. The pivoting movement of snap lever 190 is limited by the engagement of its bight portion with an integrally formed projection 202 on the bight portion of the terminal 32.

Figure 3:
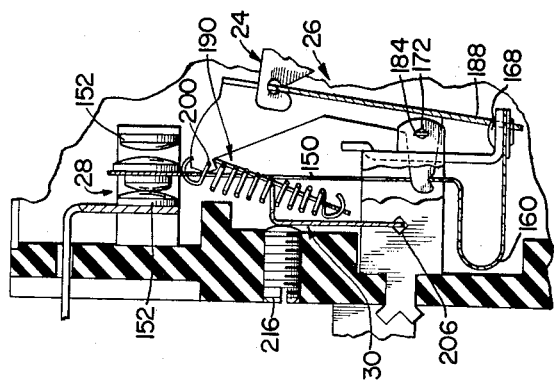
FIG. 3 is a partial cross sectional view of the snap acting mechanism shown in the second position.

As shown in FIG. 3, switch lever arm 174 has been pivoted in a clockwise direction about pin 184 so that the upper knife edge 178 which forms the pivot point for the snap lever 190 is rotated to the right of blade 150. Tension spring 200 thereby biases blade 150 in a counterclockwise direction. The movable contact 28 located on blade 150 then engages the second stationary contact 152 which is also connected to a terminal 32. When the switch lever 174 is rotated in the clockwise direction, the arms 180 act on the top edge 156 of the rectangular aperture to move switch blade 150 substantially in an upward direction as blade 150 is to the left of the pivot point of the lever as viewed in FIGS. 2 and 3.

As was previously mentioned, blade 150 has a U-shaped resilient portion 160 which is biased by arms 180. When switch lever 174 is rotated about pin 184 in a clockwise direction, switch blade 150 is biased upwardly by arms 180 engaging top edge 156. In this manner, maximum shear force is exerted between the surfaces of the movable contact 28 and the stationary contact 152, which maximum shear force provides a sliding action therebetween. Conversely, if lever 174 is rotated in a counterclockwise direction, blade 150 will be biased in a downward direction, thereby obtaining a maximum shear force between the second stationary contact 152 and the movable contact 28, which maximum shear force provides a sliding action. This arrangement, therefore, provides maximum shear force in both directions.

When the bellows 128 expands, lever 174 will move counterclockwise and arms 180 will move in a downward direction, effecting a sliding motion between the movable contact 28 and the stationary contact 152. When the bellows 128 contracts, lever 174 will move clockwise and arms 180 will move in an upward direction, thereby moving switch blade 150 and movable contact 28 upward relative to the stationary contact 152. Should the movable contact 28 weld to the stationary contact 152, it is therefore possible to obtain a shear force corresponding to the full force of spring 98 or the force of bellows 128, depending upon the position of lever 174. Therefore, the design of switch mechanism 26 insures the breaking of the contacts 28 and 152, even under heavy load conditions. In addition, the contacting surfaces of both the movable contact 28 and the stationary contact 152 are wiped upon each actuation of the switch so that good electrical conduction is always obtained.

As best shown in FIGS. 2, 3, and 4, an inverted L-shaped adjusting member 30 is pivoted between the two legs of the terminal 33. The pivoting movement of adjusting member 30 is restricted by its being mounted in a substantially diamond-shaped aperture 206. The center leg 208 of adjusting member 30 is slit so as to facilitate assembly to the terminal 33. The upper base leg 210 of the member 30 has a width which is substantially equal to the width of the snap lever 190, thereby subtending the distance between the two legs 192. The base leg 210 of adjusting member 30 has a semicircular cutout portion 212, which portion has a diameter substantially equal to the distance between the inner edges of the legs 192 of the snap lever 190. In this manner, flat edges 214, which correspond substantially to the width of each leg 192 of the snap lever 190, are formed. Each of these edges 214 will engage a leg 192 of the snap arm 190 substantially intermediate its length.

An adjusting screw 216 extends through the base 140 of the switch mechanism and will pivot the adjusting member 30 about its pivot point in aperture 206 so as to engage the legs 192 of the snap lever 190. In this manner, the adjusting member 30 controls the differential movement of the snap lever 190. It is obvious that a very small amount of travel is required for the snap lever 190 to snap to its overcenter position. In this manner, a quick-make, quick-break switch mechanism is obtained.

The snap switch mechanism 26, as described above, will operate substantially in a manner described hereinbelow in response to movement of lever 22 which actuates insulating member 24 in a horizontal direction.

When the desired ambient conditions are reached, lever 22 will be pivoted in a clockwise direction in response to movement of bellows assembly 20, thereby also pivoting lever 174 in a clockwise direction. Knife edge 178 of lever 174 passes through the overcenter position relative to switch blade 150 and tension spring 200 tends to reduce its length. When knife edge 178 is to the right of blade 150, as viewed in FIG. 2, snap lever 190 will be in an unbalanced position, so that spring 200 will exert a horizontal force on snap lever 190 to rotate the snap lever in the clockwise direction about knife edge 178. Snap lever 190 will pivot about knife edge 178 in the clockwise direction until legs 192 of snap lever 190 engage edges 214 of adjusting member 30. Spring 200 simultaneously will exert a counterclockwise movement on switch blade 150, so that movable contact 28 will engage the other fixed contact 152. Adjusting member 30 will limit the movement of snap lever 190 so that the bight portion of snap lever 190 is displaced a certain distance relative to switch blade 150 depending on the adjustment of screw 216.

As the bight portion of snap lever 190 is displaced a relatively small distance, the horizontal component of force of spring 200 will be relatively small. The horizontal component, due to the displacement of spring 200, will partially determine the contact pressure of movable contact 28 on fixed contact 152 in the second position.

As described above, positioning the adjusting member 30 relative to the snap lever 190 determines the contact pressure in the second position and the displacement necessary for lever 174 to actuate the switch mechanism. Adjusting member 30 engages both legs of snap lever 190 to prevent any lateral distortion thereof to thereby obtain precise differential adjustment of switch mechanism 26.

It is especially desirable that when the snap lever 190 is in engagement with adjusting member 30, a relatively small movement would be required to cause the snap lever 190 to move again to its first position. An example of this would be in a refrigerator control in which the second position of the snap lever 190 closes an electrical circuit which can be a signal position or a "defrost" position. When it is necessary to actuate the refrigerating circuit of the refrigerator, it is merely necessary to move the switch lever arm 174 a short distance to place the switch mechanism 26 in energizing control position.

The switch mechanism 26, as described above, can be mounted as a separate subassembly to the base member 140 and then assembled to the housing 10. The particular structure for mounting the switch mechanism 26 and base member 140 to the housing 10 can take various forms, such as clips, screws, staking, or interengagement of projections on the base member 140 with apertures in the side walls of the housing 10.

As shown in FIGS. 1 and 2, a cover is placed across the topmost opening of the housing 10 and forms the top wall 220. Top wall 220 is retained in position by any suitable means, such as a clip member 222 shown in FIG. 1, which subtends the distance between side walls 36 of the housing 10 and engages the outer portion of the side walls thereof so as to securely retain the top wall 220 in position.

In operation, the control device is set at a maximum response to the thermostatic ambient by rotation of cam mechanism 16 clockwise, whereby adjustment spring and screw assembly 14 are set at a minimum so that the spring tension is substantially the smallest amount that can be exerted on lever 18. The force generated by the charge within the bellows 20 will force the lever 18 upwardly so as to pivot in a counterclockwise direction about its left end against the force of the spring 98. However, this movement is restricted by lower adjustment screw 110 which engages the upper edge of rectangular aperture 44 in the front wall 34 of housing 10. As the snap lever 190 is pivoted about a point which is overcenter of the blade 150, stationary contact 152 and movable contact 28 are engaged. It will, however, be understood that the ambient conditions measured by the charge in the bellows assembly 20 will vary the force exerted by the bellows on lever 22 so that the switch mechanism 26 will be acted upon in response to the ambient conditions.

If, however, cam mechanism 16 is rotated in a counterclockwise direction, as viewed in FIG. 1, lug 76 will be acted upon by a downward force, thereby actuating the slide plate 12 downwardly to further compress resilient spring 98. If cam 50 is rotated a maximum distance, adjustment screw 72 located on the slide plate 12 will engage the upper surface of lever 18 to positively pivot lever 18 in a clockwise direction. In so doing, the lever 22 will pivot switch lever arm 174 in a clockwise direction, thereby actuating the switch mechanism 26 to the second control position. When the cam mechanism 16 is rotated in a counterclockwise direction the maximum distance, the bellows 20 will exert an upward force on lever 18, which force is not sufficient to overcome the downward force of spring 98.

It is apparent that the cam mechanism 16 can be set at various intermediate conditions at which the bellows member 20 will respond to ambient conditions.

It is axiomatic, therefore, that the switch mechanism and control described above can be readily adapted to a heating or a cooling system having a great range of temperatures wherein the only changes that need be made are the compressive force of the adjustment spring and screw assembly 14 and the charge used in the bellows assembly 20 to respond to the desired ambient conditions.

The control described above is particularly adapted to a refrigerating control. In this case, the first circuit only would be required unless the second circuit were desired for signal or defrosting purposes. As such, the charge used in the bellows assembly 20 would be a charge that contracts with a decrease in temperature, which charges are well known in the art. If, however, this control were used in a heating system, the second circuit only would be used.

While only a single embodiment has been shown and described in connection with this device, it is apparent that there may be many changes in structure and operation, as well as application, without departing from the scope of this invention as defined by the appended claims.

I claim:

1. In a control device, a combination comprising an expansible thermal responsive device, a casing, a lever means pivoted between the side walls of said casing and being adapted for actuation in one direction by said thermal responsive device, biasing means adapted to actuate said lever means in the opposite direction, switch means actuated by said lever means between energized and deenergized positions and a slide member adapted for movement on one wall of said casing, a stem member slidably securing said slide member to said wall, a cam member carried by said stem member, and cam follower means operatively engaging said cam member and secured to said slide member to move said slide member in response to movement of said cam, and said biasing means being mounted on said slide member whereby the force of said biasing means is varied by rotational movement of said stem to thereby prevent actuation of said switch means until said thermal responsive means registers a predetermined ambient condition, said slide member comprising a support means located adjacent the lower portion of said slide member, and adjustable means adapted to be positioned on said support means for engagement with said lever means, whereby rotational movement of said cam member moves said adjusting means into engagement with said lever means to positively actuate said lever means to open said switch means and deenergize the electrical circuit.

2. In a control device, the combination comprising an expansible thermal responsive device, a substantially U-shaped casing having a front wall and a pair of side walls, said front wall having an aperture, a lever member pivoted between said side walls of said casing adjacent an open side thereof and extending toward said front wall, a tab integrally formed on the free end of said lever adapted to cooperate with the wall of said aperture, and biasing means slidably mounted on said front wall and being adapted to actuate said lever means in one direction, said tab operatively cooperating with said aperture wall to restrict movement of said lever means in said one direction, said thermal responsive device being adapted to enclose the bottom portion of said casing and to actuate said lever member in an opposite direction whereby said casing and said thermal responsive device are separate subassemblies, said tab including an adjustment means mounted thereon adapted to cooperate with the upper edge of said aperture wall to thereby adjustably limit the maximum movement of said lever actuated by said thermal responsive means against the biasing means.

3. In a control device, the combination comprising an expansible thermal responsive device, lever means adapted to transmit motion of said thermal responsive device, an arcuately formed switch lever means operatively connected to said lever means and having upper and lower arm portions, a contact carrying switch blade adapted for pivotal movement and operatively connected to said lower arm portion of said switch lever means, said switch blade being adapted to translate substantially the length thereof the motion of said lower arm portion of said switch lever means, said switch lever means being pivoted about a point adjacent said lower arm portion, one or more stationary contacts adapted to limit pivotal movement of said switch blade, and snap action means adapted to interconnect said switch lever means and said switch blade, said snap action means being actuated to an unbalanced position by said switch lever means to move said switch blade into engagement with one of said stationary contacts, and said switch blade being adapted to translate said pivotal movement of said lower arm into substantially rectilinear movement to thereby wipe the engaging surfaces of the stationary and movable contacts.

4. A control device as claimed in claim 3 wherein each of said upper arm portion and said lower arm portion of said switch lever means comprises two spaced arm members, said upper arm portion being adapted to form a knife edge on the lower edge of each of said spaced arm members, a U-shaped snap lever having leg members adapted to cooperate with each of said knife edges, and biasing means operatively interconnecting the bight portion of said U-shaped snap lever to said switch blade and being adapted to operatively engage each said leg member of said U-shaped snap lever in said knife edge whereby pivotal motion of said lever means locates said knife edges in an unbalanced position relative to said switch blade to actuate said switch blade between said stationary contacts.

5. In a control device, the combination comprising an expansible thermal responsive device, spaced stationary contacts, lever means adapted to transmit motion of said thermal responsive device, arcuately formed switch lever means operatively connected to said lever means and having upper and lower arm members, a substantially rigid current carrying switch blade having a resilient end portion and a movable end portion, a centrally disposed slot in said switch blade, contact means affixed to said movable end portion and disposed for alternate engagement with said stationary contacts, said switch lever means being pivotally mounted adjacent said lower arm member, said lower arm member being disposed to operatively connect said switch blade and said switch lever means, said upper arm member of said switch lever means being adapted to pass through said slot in said blade, and snap action means adapted to interconnect said upper arm of said switch lever means and said switch blade, said snap action means being actuated to an unbalanced position by said switch lever means to move said switch blade into engagement with one of said stationary contacts, and said switch blade being adapted to translate said pivotal movement of said lower arm into substantially rectilinear movement to thereby wipe the engaging surfaces of the stationary and movable contacts.

6. In a control device, the combination comprising an expansible thermal responsive device, lever means adapted to transmit motion of said thermal responsive device, switch lever means operatively connected to said lever means, a contact carrying switch blade operatively connected to said switch lever means and being adapted to translate substantially the length thereof the motion of said switch lever, one or more stationary contacts adapted to limit the movement of said switch blade, a pivotal snap action member adapted to interconnect said switch lever means and said switch blade, and adjustable stop means adapted to engage an intermediate portion of said snap action member whereby the over center snap position of said snap action member relative to said switch lever means is variable to obtain differential movement thereof, said adjustable stop means comprising an L-shaped member pivoted about one leg and being adapted to form two spaced projections on the second leg, the snap action member being formed to have a U-shaped configuration, said spaced projections having edges adapted to engage an intermediate portion of each leg of said U-shaped member to variably adjust the differential movement of said snap action member in the over center position.

7. In a control device, the combination comprising an expansible thermal responsive device, a lever means being adapted for actuation in one direction by said thermal responsive device, a biasing means being adapted to actuate said lever means in an opposite direction, means for adjustably varying the force of said biasing means, said lever means being enclosed in a substantially U-shaped casing having a front wall and a pair of side walls, said front wall having an aperture, said lever member being pivoted between said side walls of said casing and extending toward said front wall, a tab integrally formed on the end of said lever adapted to cooperate with the wall of said aperture, said tab actively cooperating with said aperture wall to restrict movement of said lever means and having an adjustment means mounted thereon adapted to cooperate with the upper edge of said aperture wall to thereby adjustably limit the maximum movement of said lever, said lever means having a second lever member operatively mounted on said first lever member and being adapted to extend substantially normal to said first lever member and centrally of said casing, whereby the resultant movement of said thermal responsive device and said biasing means is translated substantially normal to the resultant force acting on said first lever, and switch lever means operatively connected to said second lever member, a contact carrying switch blade adapted for pivotal movement and operatively connected to said switch lever means, said switch blade being adapted to translate substantially the length thereof the motion of said switch lever means, at least one stationary contact adapted to limit the pivotal movement of said switch blade, and snap action means adapted to interconnect said switch lever and said switch blade, said snap action means being actuated to an imbalanced position by said lever means to pivotally move said switch blade into engagement with one of said stationary contacts in response to varying ambient conditions.

References Cited by the Examiner

UNITED STATES PATENTS

| | | | |
|---|---|---|---|
| 1,111,182 | 9/14 | Rouse | 200—136 |
| 1,692,540 | 11/28 | Benson | 200—136 |
| 1,874,660 | 8/32 | Vaughn | 200—137 |
| 1,997,262 | 4/35 | McGoldrick | 200—139 |
| 2,128,807 | 8/38 | Ettinger | 200—139 |
| 2,318,553 | 5/43 | Raney | 200—83 |
| 2,598,563 | 5/52 | Konle et al. | 200—140 |
| 2,804,525 | 8/57 | Mantz | 200—140 |
| 2,853,583 | 9/58 | Rauh | 200—140 |
| 2,891,125 | 6/59 | Miller | 200—137 |
| 2,901,578 | 8/59 | Noakes | 200—140 |
| 2,937,255 | 5/60 | Ulanet | 200—137 |

BERNARD A. GILHEANY, *Primary Examiner.*

MAX L. LEVY, *Examiner.*